April 7, 1936.   F. KRAMER   2,036,338
CLOTHESLINE FASTENER
Filed Dec. 11, 1934

INVENTOR.
FRANK KRAMER
BY Kwis, Hudson & Kent
ATTORNEYS.

Patented Apr. 7, 1936

2,036,338

UNITED STATES PATENT OFFICE 2,036,338

CLOTHESLINE FASTENER

Frank Kramer, Cleveland Heights, Ohio

Application December 11, 1934, Serial No. 756,988

6 Claims. (Cl. 24—134)

This invention relates to a fastener for clothes-line and the like, and as its principal object aims to provide an improved device of this kind comprising a minimum number of parts which can be very cheaply manufactured and assembled.

Another object of the invention is to provide an improved fastener, for clothes-line and the like, comprising a bracket having a clamping member thereon, and wherein novel means is provided for mounting the clamping member on the bracket.

Another object of the invention is to provide a fastener, of the type referred to, wherein the bracket is provided with a pivot member on which the locking member is operably mounted, and wherein the pivot member and the locking member are provided with cooperating portions shaped to permit assembly of said members by relative movement therebetween, but to prevent separation thereof during movement of the locking member within its normal operating range.

A further object of the invention is to provide an improved fastener, of the type mentioned, comprising an open U-like bracket having a pivot member thereon and a weighted locking member on the pivot member and movable by gravity toward a position of clamping cooperation with the bracket, and wherein lug and slot connection elements provided on the locking member and pivot member are arranged to permit assembly of these parts while the locking member is in abnormal position and to prevent disengagement of the parts during movement of the locking member within its normal operating range.

Other objects and advantages of the invention will be apparent from the following description, when taken in conjunction with the accompanying sheet of drawings wherein, Fig. 1 is an end elevation of a fastening device constructed according to my invention.

Fig. 2 is a side elevation thereof.

Figure 1:
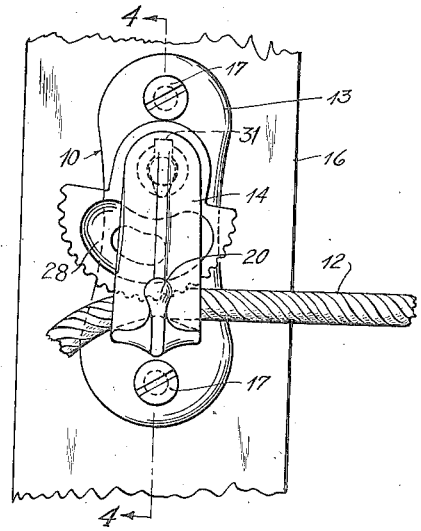
Figure 2:
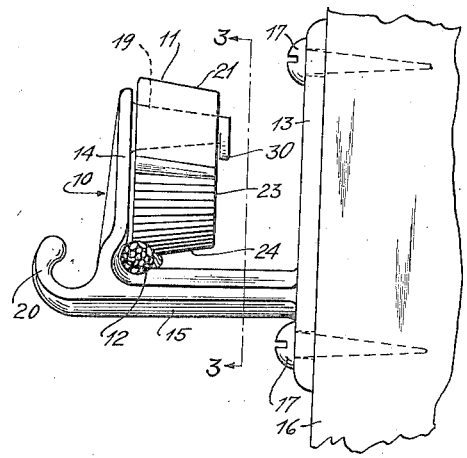
Figure 3:
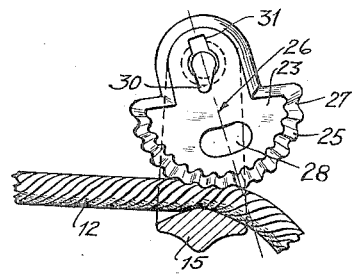
Fig. 3 is a transverse sectional view taken through the device as indicated by line 3—3 of Fig. 2.

In the accompanying drawing to which detailed reference will now be made, I have shown the improved clothes-line fastener of my invention which, as will be explained more fully hereinafter, comprises a minimum number of parts adapted to be cheaply manufactured and to be assembled without the need of tools or machine operations. It will be understood, of course, that the fastening device shown in the drawing is to be regarded as illustrative only and that the invention may be embodied in various other constructions for devices of this kind.

As mentioned above, the improved fastener of my invention comprises a minimum number of parts and, as will be seen from the drawing, the present embodiment of my invention comprises only a bracket 10 and a locking member 11, the locking member being mounted on the bracket so that a portion thereof cooperates with a part of the bracket for clamping a clothes-line 12 or the like therebetween.

While the bracket of my fastening device may be constructed of any desired shape or form, it is usually desirable that the bracket be of an open type so that the line can be readily brought into position to be engaged by the locking member by simply dropping the line or a loop thereof into the opening of the bracket and without the need of threading the end of the line through the device. Furthermore, as will be explained hereinafter, the open type of bracket more readily permits assembly of the locking member in operative position on the bracket.

The bracket 10 is of the open type mentioned above, and the bracket may, as represented in this instance, be of U-like shape having spaced upwardly extending legs 13 and 14 and a transverse part 15 forming a lower connecting part for the spaced legs. The leg 13 may comprise an attaching plate which is adapted to be secured against a post, wall or other support 16 by suitable fastening devices or screws 17. The leg 14 may be provided with a pivot member or pin 19 which extends toward the leg 13 and upon which the locking member 11 is mounted for swinging movement. The bracket may, if desired, be provided with a hook extension 20 which, in this instance, is shown as being formed as an integral extension of the lower connecting part 15. This hook extension may be provided or omitted as desired, and when provided on the bracket may be used for hanging a clothes-line reel thereon or for any other desired purpose.

Figure 4:
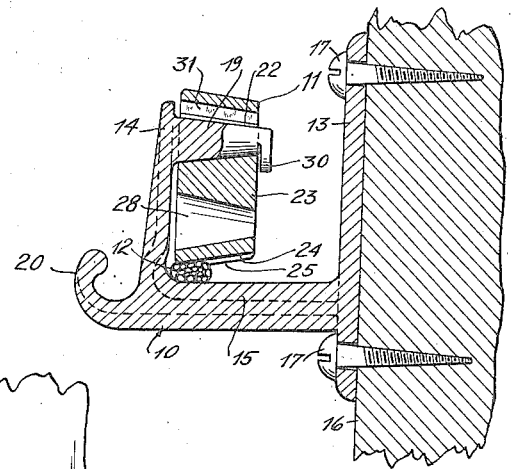
Fig. 4 is a longitudinal sectional view taken through the device as indicated by line 4—4 of Fig. 1.

The locking member 11 is of the eccentric type, having an eye portion 21 provided with an opening 22 for the pivot member 19, and an enlarged and weighted cam or locking part 23 which is eccentrically disposed with respect to the center of the opening 22. The bracket and the locking member are so proportioned that when the locking member is assembled for swinging movement on the pivot member, as shown in the drawing, the arcuate face 24 of the cam portion 23 will be in adjacently spaced relation to the top of the lower connecting part 15 of the bracket, so that the cam face and the connecting part of the bracket are adapted to cooperate to clamp the line 12 therebetween. If desired, the cam face 24 of the locking member may be tapered, as shown in Fig. 4, so as to facilitate insertion of the line 12 beneath the locking member, and, if desired, the cam face of the locking member may also be formed with integral teeth or irregularities which tend to prevent slipping of the line past the leveling member and enable the latter to more securely grip the line.

It will be understood, of course, that in constructing the locking member I shape the arcuate cam face 24 so that it will cause maximum gripping action when the locking member is in the position with its axis 26 parallel to the axis of the arm 14. I obtain this result by reducing the width of the locking member such as by slightly flattening the end portions 27 of the cam face thereof. To avoid having the locking member contain an undue amount of material, this member may be provided with a recess 28 therein.

As an important feature of my invention, I provide for the mounting of the locking member on the pivot member 19 in such a manner that the locking member can be readily assembled on the bracket without the need for machine operations or the use of tools, and will nevertheless be retained against disengagement from the bracket during movement within its normal operating range. The specific details of this novel mounting means for the locking member may be varied considerably, but I find that cooperating lug and slot elements provided on the bracket and locking member serve very well for this purpose and mounting means of this type is shown in the drawing. The cooperating lug and slot elements are here shown as comprising the lug 30 of the pivot member 19 and the slot 31 of the locking member. As shown in the drawing, the lug 30 may be formed integral with the pivot member 19 and at the inner end thereof, and may be made to extend toward the transverse connecting part 15 of the bracket. The slot 31 of the locking member communicates with the opening 22 thereof and is of a size and shape to accommodate the lug 30 so that when the lug and slot are brought into registering relation the lug may pass through the slot. It will be noted, however, that the slot 31 of the locking member is located at the top of the opening 22, or, in other words, on a part of the locking member which is opposed to the weighted cam part 23.

Figure 5:
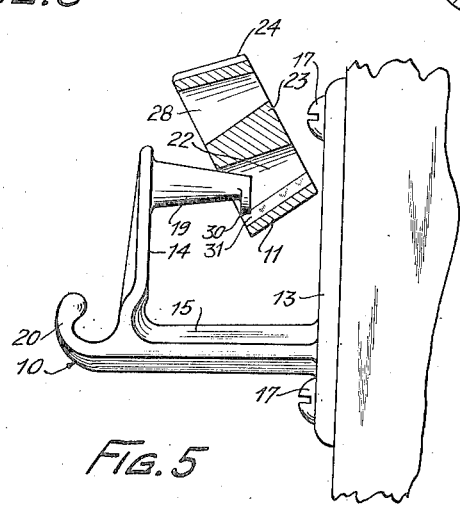
Fig. 5 is a side elevation, with parts in section, illustrating the assembly of the two parts comprising the device.

When the locking members is to be assembled on the pivot member of the bracket, the locking member is inverted so that the weighted cam portion 23 thereof is uppermost and the locking member is then brought to the position indicated in Fig. 5 of the drawing. In this position of the parts, the inner or free end of the pivot member 19 which is spaced from the plate 13, is just entering the opening 22 of the locking member and the lug 30 of the pivot member registers with the slot 31. By further relative axial movement between the locking member and the bracket, the pivot member 19 may be made to extend through the opening of the locking member so that the lug 30 passes completely through the slot 31. Thereupon the weighted portion 23 of the locking member is allowed to drop by gravity toward the transverse connecting part 15, with the locking member swinging or pivoting on the member 19. This swinging movement brings the weighted cam part 23 into its normal operating range, at the same time causing the slot 31 to move out of registering position with the lug 30 so that disengagement of the locking member from the pivot member will thereafter be prevented by the lug.

It will be understood, of course, that in the production of my improved fastening device the bracket 10 and the locking member 11 may be constructed of any suitable material, but will preferably be formed of metal. It will also be understood that these parts may be produced by any appropriate method or method steps, such as casting, forging or the like. In this connection it will be understood further that the pivot member 19, the opening 22 of the locking member, and the cam face 24, may or may not be tapered as shown in the drawing, but it is usually desirable to provide these parts with a slight taper, because it facilitates the manufacture of the parts. This taper may also facilitate the assembly of the parts, since it enables the pivot member of the bracket to be more readily inserted through the opening of the locking member.

In the use of my improved fastening device, the clothes-line 12 or the like is dropped into the opening of the bracket and brought between the cam face 24 of the locking member and the transverse part 15, usually by causing the locking member to be swung toward its released position. The slack of the line is then taken up by drawing the line through the bracket, this movement of the line being readily permitted by swinging of the locking member toward its free or released position. When the slack has been taken up, the tendency for the line to move backwardly out through the bracket causes the locking member to swing on the pivot member 19 in a direction tending to bring the axis 26 of the locking member in parallelism toward the axis of the arm 14, and this movement of the locking member causes the cam face 24 thereof to clamp the line against the transverse part 15. After this clamping action has once begun the greater the pull on the line in a direction to withdraw it from the bracket, the greater will be the clamping action on the line.

From the foregoing description and the accompanying drawing it will now be readily seen that I have provided an improved form of fastener for clothes-line or the like, and that my improved device comprises a minimum number of parts which can be very cheaply manufactured and which can be readily assembled without the need of tools or machine operations.

While I have illustrated and described the improved fastening device of my invention in a somewhat detailed manner, it will be understood, of course, that I do not wish to be limited to the details of construction and arrangements of parts herein disclosed, but regard the invention as including such changes and modifications as do not involve a departure from the spirit of the invention and the scope of the appended claims.

Having thus described my invention, I claim:

1. A fastener for clothes-line or the like comprising a bracket having a pivot member thereon, and a locking member having an opening for the pivot member and also having an eccentric portion adapted to cooperate with a part of the bracket for clamping the line therebetween, said pivot member and the opening of said locking member being shaped to permit assembly of said members by relative movement therebetween but to prevent separation thereof during movement of the locking member within its operating range.

2. A fastener for clothes-line or the like comprising an open bracket having a pivot member thereon, and a locking member having an opening for the pivot member and also having an eccentric portion adapted to cooperate with a part of the bracket for clamping the line therebetween, said pivot member and the opening of said locking member being shaped to permit assembly of said members by relative movement therebetween but to prevent separation thereof during movement of the locking member within its operating range.

3. A fastener for clothes-line or the like comprising a bracket having a pivot member thereon extending laterally in spaced relation above another part of the bracket, a locking member having an opening for the pivot member and a weighted eccentric portion adapted to cooperate with such other part of the bracket for clamping the line therebetween, and lug and slot elements for said pivot member and said locking member permitting assembly of said members while in one relative position but preventing disengagement of the locking member while the latter is in operating position.

4. A fastener for clothes-line or the like comprising a U-like bracket having spaced legs with a lower connecting part and a pivot member on one leg extending toward the other leg, a member adapted to swing on said pivot member and having an eccentric gravity actuated locking part adapted to clamp the line against said lower connecting part, said swinging member having a slot therein, and projecting means on said pivot member adapted to pass through said slot when said members are in one relative position and to prevent disengagement of said swinging member when the latter is in cooperating relation to said lower connecting part.

5. A fastener for clothes-line or the like comprising a bracket having a pivot member thereon, and a locking member having an opening for the pivot member and also having an eccentric portion adapted to cooperate with a part of the bracket for clamping the line therebetween, said pivot member having a retaining lug thereon extending toward said bracket part and the opening of said locking member having a clearance slot for the lug at the side thereof opposite said eccentric portion.

6. A fastener for clothes-line or the like comprising a U-like bracket having spaced legs with a lower connecting part and a pivot member on one leg extending toward the other leg, a member adapted to swing on said pivot member and having an eccentric gravity actuated locking part adapted to clamp the line against said lower connecting part, and means providing for assembly of the swinging member on said pivot member but preventing removal of the swinging member while the eccentric part thereof is in cooperating relation to said connecting part, said means comprising a lug at the free end of the pivot member and a clearance space on the swinging part adapted to accommodate said lug, the free end of said pivot member being spaced from said other leg of the bracket to permit assembly movement of the swinging member therebetween.

FRANK KRAMER.